Patented June 13, 1950

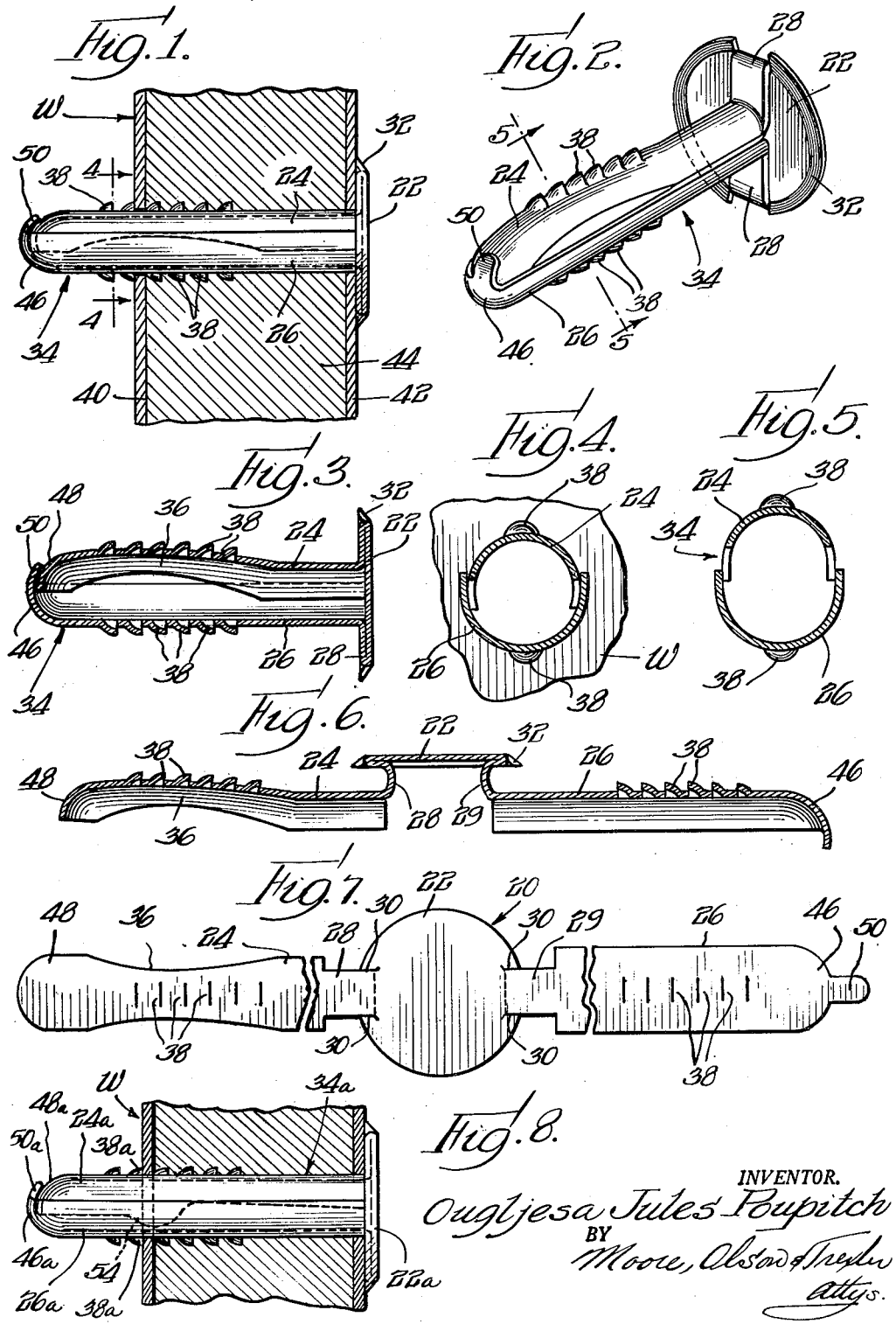

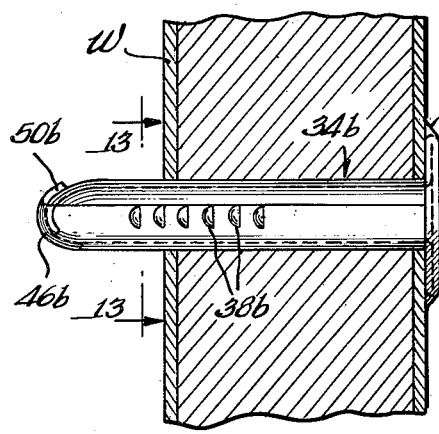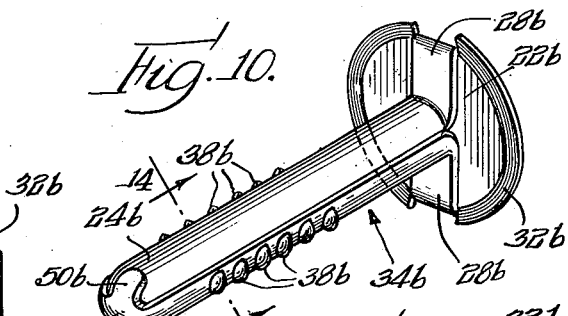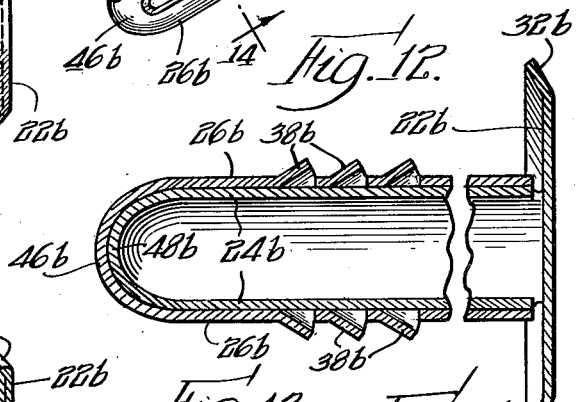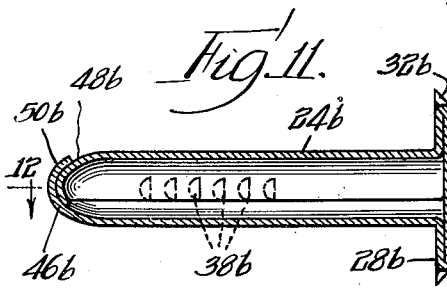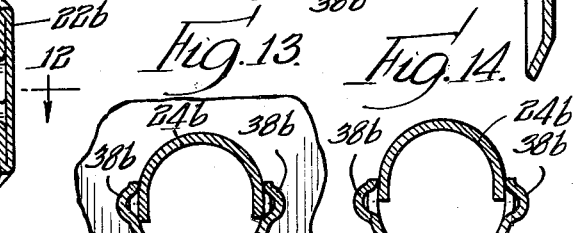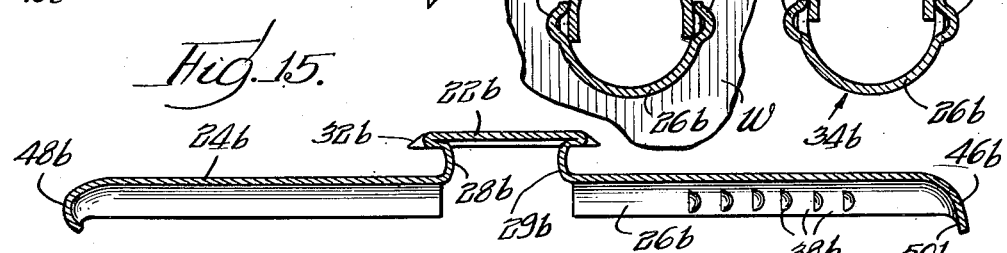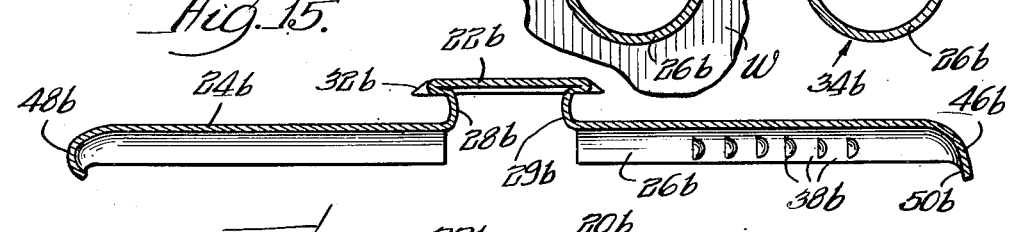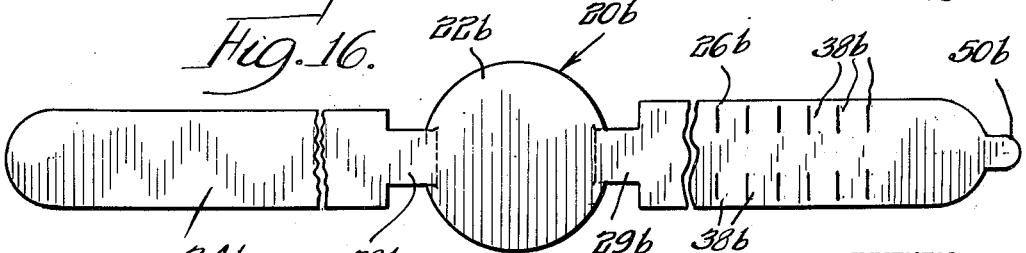

2,511,512

UNITED STATES PATENT OFFICE 2,511,512

DRIVE FASTENER

Ougljesa Jules Poupitch, Chicago, Ill., assignor to Illinois Tool Works, Chicago, Ill., a corporation of Illinois Application June 19, 1947, Serial No. 755,674

10 Claims. (Cl. 85—5)

This invention relates to fastening devices formed of sheet metal and which are adapted to be forcibly driven into the work with a hammer or like tool, such devices customarily being referred to as "drive fasteners."

An object of the present invention is to provide an improved one-piece drive fastener which insures a tight seal of the work aperture.

A further object is to provide a unitary drive fastener of novel construction having a sealing head and a hollow, closed stud which is adapted to be tensioned transversely in a uniform manner by the wall of the work aperture.

A still further object is to provide an improved sealing drive fastener of the aforesaid character in which the stud portion, while capable of flexing transversely to conform with the wall of the work aperture, nevertheless has great rigidity so that the fastener firmly grips the work and cannot be removed therefrom except by the application of considerable force.

Another object is to improve the construction of tubular drive fasteners whereby the interior of the hollow stud is substantially completely sealed, such improvements including a lap joint on the nose of the stud to prevent the entrance of foreign matter into the stud.

Yet another object is to provide a drive fastener with a tubular shank comprising a pair of channel-shaped legs arranged so that their longitudinal edges may overlap or telescope thereby to permit transverse flexing of the shank while having a mutual reinforcing effect.

An additional object is to provide various forms of drive fasteners incorporating therein all of the foregoing improvements, as well as other features and advantages as disclosed in the specification and the accompanying drawings.

In the drawings:

Fig. 1 is a section through a work piece showing, in elevation, a drive fastener mounted therein, the fastener being constructed in accordance with and embodying the principles of the invention;

Fig. 2 is a perspective view of the drive fastener shown in Fig. 1, before insertion thereof in the work piece;

Fig. 3 is a longitudinal section through the drive fastener of Fig. 2;

Fig. 4 is a cross-sectional view taken on the line 4—4 in Fig. 1;

Fig. 5 is a cross-sectional view taken on the line 5—5 in Fig. 2;

Fig. 6 is a longitudinal section of a partially formed drive fastener;

Fig. 7 is a plan view of the blank from which the fastener is formed;

Fig. 8 is a view similar to Fig. 1, but showing a modified drive fastener;

Fig. 9 is a view similar to Fig. 1 but showing still another modified drive fastener;

Fig. 10 is a perspective view showing the drive fastener of Fig. 9 before insertion thereof into the work piece;

Fig. 11 is a longitudinal section taken through the drive fastener of Fig. 10;

Fig. 12 is a longitudinal section on the line 12—12 in Fig. 11;

Fig. 13 is a cross-sectional view on the line 13—13 in Fig. 9;

Fig. 14 is a cross-sectional view on the line 14—14 in Fig. 10;

Fig. 15 is a longitudinal section of a partially formed drive fastener according to the embodiment illustrated in Fig. 10; and Fig. 16 is a plan view of the blank used in forming a drive fastener as shown in Fig. 10.

Referring to Figs. 1 through 7, the drive fastener therein illustrated is formed from suitable sheet material by punching, stamping or other expedient forming methods. The midportion of the blank 20 is disc-shaped to afford a head 22. Leg portions 24 and 26 extend from the head 22, being connected to the head 22 by neck portions 28 and 29 which are extended partially into the head 22 as indicated by the short slits 30, Fig. 7. Each of the legs 24 and 26 is formed into a channel shape in cross section. The radii or equivalent dimensions of the channel-shaped leg members 24 and 26 differ so that the legs may be brought together in transversely telescoped or overlapping relation as indicated in Fig. 5. The two legs 24 and 26, when assembled in this manner, constitute a tubular stud or shank 34 for the drive fastener. The necks 28 are folded against the underside of the head 22 and are bent at right angles where they join the legs 24 and 26.

The stud portion 34 of the fastener is adapted to be inserted in an aperture work piece W, Fig. 1, the rim 32 of the head 22 being formed so as to seat snugly on one surface of the work piece. In this embodiment of the invention the leg 26 is substantially straight throughout its length. The leg 24, however, has a bowed, narrow section 36 which normally tends to diverge from the companion leg 26 as shown in Figs. 2 and 3. When the fastener is inserted in the work, the legs 24 and 26 are urged transversely toward each other from the positions thereof shown in Fig. 5 to those illustrated in Fig. 4.

The amount of overlap between the longitudinal edges of the legs 24 and 26 increases as the legs are thus telescoped transversely. On each leg there is formed a punched-out series of longitudinally spaced teeth or lugs 38 that are adapted to grip the work and prevent retrograde movement of the drive fastener.

An important feature of the present invention is that the fastener is self-sealing, that is, the shank of the fastener is completely enclosed when the fastener is mounted in the work aperture and is adapted, in conjunction with the head 22, to prevent particles of dirt, oil and the like from penetrating the work through the aperture. Fasteners of this type commonly are used in securing articles to the floor or dash panels of vehicles, where it is necessary to insure that the interior of the vehicle is kept as clean as possible. To this end the legs 24 and 26 are so constituted and arranged that they are in overlapped relation throughout the extent of their longitudinal edge portions when the fastener is mounted in the work.

The fastener may be used, for example, to secure together alternating layers or panels of rigid and compressible material such as the panels 40 and 42, Fig. 1, and the intervening compressible pad 44. Preferably, the fastener is of sufficient length so that the stud thereof protrudes from the exterior panel 40 when the head 22 is seated on the interior panel 42. The teeth 38 are adapted to selectively engage the outer surface of the panel 40 depending upon the thickness of the work piece W, the pad 44 yielding sufficiently to insure such selective engagement. It will be understood, however, that the drive fastener is not limited to such use and may be employed in other situations as, for example, securing objects to plastic supporting bodies wherein the fastener is inserted in a blind hole to be retained therein solely by the gripping action of its teeth 38 on the wall of the aperture. The bowed construction of the stud causes the application of transverse outward pressure to the teeth 38 as the legs 24 and 26 are squeezed together.

To increase the tension on the legs 24 and 26, and also for the purpose of preventing the entrance of foreign matter such as the material of the compressible pad 44 into the interior of the stud when the same is driven into the work piece W, the nose portion 46 at the forward end of the leg 26 is rounded or cup-shaped to receive the nose portion 48 of the leg 24 which fits within the nose 46. A tab 50 on the tip of the nose 46 is curved around the nose 48 and extends slightly rearward, insuring a tight seal of the nose when the stud is driven through the work material.

The above described fastener has a wide variety of uses and is highly dependable in service. It is quickly and easily manufactured from sheet stock. The transversely telescoped relation of the legs and the cupped nose portion serve to prevent unwanted displacement of the legs relative to each other after the forming operation has been completed and insure a good seal of the work aperture. Once inserted in the work, the drive fastener locks itself in position and cannot be removed without the application of considerable force thereto.

In Fig. 8 there is illustrated a form of drive fastener which is similar to that shown in the preceding views, except that the leg 24a is substantially straight instead of bowed and is provided near its midportion with extended leaves 54 which are adapted to fit inside of the leg 26a thereby to afford the required resiliency for urging the teeth 38a outwardly into engagement with the work.

In Figs. 9 to 16 there is illustrated still another embodiment of the invention in which the legs 24b and 26b of the stud 34b are substantially straight throughout, the leg 24b telescoping transversely within the leg 26b as indicated. The blank 20b from which the fastener is formed is illustrated in Fig. 16. In this instance both sets of teeth 38b are located on the leg 26b respectively adjacent the longitudinal margins thereof. If desired, the teeth 38b may consist of wings sheared from the edges of the leg 26b. The longitudinal marginal portions of the leg 24b are disposed behind these teeth when the fastener is assembled, as shown in Fig. 12. The nose portions 48b and 46b of the legs 24b and 26b respectively are overlapped as in the case of the previously described embodiments, the nose 46b being provided with a tab 50b that is curved around the nose 48b. The interior of the stud 34b is completely enclosed even when the fastener is free of the work. Preferably the over-all dimensions of the stud in cross section are slightly larger than the work aperture to insure a snug, sealing fit of the stud in the aperture. The head 22b is in sealing engagement with the interior surface of the work piece W.

The teeth 38b are urged with considerable force radially against the wall of the work aperture due to the reinforcing effect produced by overlapping the channel members or legs 24b or 26b directly behind these teeth. The thickness of the stock from which the fastener is formed may be selected to achieve the desired resiliency of the stud. This embodiment has the advantage of being self-sealing as in the case of the above described forms of the invention.

It is obvious that various changes may be made in the specific embodiments set forth for purposes of illustration without departing from the spirit of the invention. The invention is accordingly not to be limited to the specific embodiments shown and described, but only as indicated in the following claims.

The invention is hereby claimed as follows:

1. A one-piece drive fastener formed of resilient sheet material and comprising a head for engaging one surface of a work piece, a tubular shank adapted for insertion within a work aperture and including a pair of elongated shank members of substantially semi-circular channel-shaped cross section, the opposite margins of one shank member being telescopically associated within the opening provided by the opposite channel-shaped member and positioned adjacent the opposite margins of said latter member, whereby when said shank is forced longitudinally within a work aperture, the telescopically associated margins will provide closed shank sections throughout their length, and work-engaging, locking protuberances provided along the periphery of said shank, said shank being provided with a blunt entering extremity.

2. A one-piece drive fastener in accordance with claim 1 wherein the entering extremity of one of the shank members overlaps the adjacent entering extremity of the other member.

3. A one-piece drive fastener in accordance with claim 1 wherein the shank member transversely telescoped within the other member is of less cross sectional size than its companion member.

4. A one-piece drive fastener in accordance with claim 1 wherein the entering extremities of the channel-shaped shank members adjacently overlap each other to provide a rounded nose.

5. A one-piece drive fastener in accordance with claim 4 wherein a tab extends from the overlapping, rounded nose portion in adjacent interlocking association with the underlying nose portion so as to insure against separation of the shank members at the entering ends thereof.

6. A one-piece drive fastener in accordance with claim 1 wherein one of the shank members is normally bowed outwardly.

7. A drive fastener comprising a head adapted to engage one surface of a work piece, and a tubular shank including two substantially semicircular channel-shaped legs having different transverse dimensions and arranged to telescope transversely upon insertion of the fastener into a work aperture, the smaller of said legs having an enlarged portion affording leaves adapted to fit within the larger of said legs, a series of longitudinally spaced work-engaging protuberances on said smaller leg, and another series of longitudinally spaced protuberances on said larger leg.

8. A drive fastener comprising a head adapted to engage one surface of a work piece, and a tubular shank, said shank including two substantially semi-circular channel-shaped sections of different sizes adapted to be telescoped transversely relative to each other upon insertion of the shank into a work aperture, the larger of said channel-shaped sections having a plurality of lugs along each longitudinal margin thereof for resiliently engaging a work piece and to resist removal of said fastener from the work piece, the smaller of said channel-shaped sections reinforcing the longitudinal margins on said larger channel-shaped section when the fastener is in a tensioned condition in said work piece.

9. A drive fastener comprising a blank bent adjacent its midportion to provide a head, and two substantially semi-circular channel-shaped shank portions of different sizes and lengths extending from said head, the smaller of said shank portions being adapted to telescope transversely within the larger of said shank portions, said larger shank portion having spaced protuberances adjacent its longitudinal edges to engage a work piece, and a tab adjacent the end of said larger shank portion remote from said head adapted to be bent into overlapping relation to said smaller shank portion to maintain both said shank portions in telescoped relation.

10. A drive fastener comprising a head adapted to engage one surface of the work piece, and a shank including two substantially semi-circular channel-shaped sections of different sizes adapted to embrace each other along their longitudinal margins, the larger of said channel-shaped sections having a plurality of spaced protuberances along each longitudinal margin thereof to prevent retrograde movement of the fastener relative to the work piece, the portion of said larger channel-shaped section remote from the head being formed into a cup adapted to receive the end of the smaller channel-shaped section thereby to retain the sections in embraced relation and close the forward end of said shank.

OUGLJESA JULES POUPITCH.

REFERENCES CITED

The following references are of record in the file of this patent:

UNITED STATES PATENTS

| Number | Name | Date |
|---|---|---|
| 2,084,717 | Wiley | June 22, 1937 |
| 2,267,873 | Place | Dec. 30, 1941 |
| 2,391,298 | Davis | Dec. 18, 1945 |